United States Patent [19]

Bopp

[11] Patent Number: 4,782,936
[45] Date of Patent: Nov. 8, 1988

[54] TWO MASS FLYWHEEL ASSEMBLY WITH TORSIONAL DAMPING MEANS

[75] Inventor: Warren G. Bopp, Farmington Hills, Mich.

[73] Assignee: Eaton Corporation, Cleveland, Ohio

[21] Appl. No.: 58,735

[22] Filed: Jun. 5, 1987

[51] Int. Cl.⁴ .......................... F16F 15/10; F16D 3/14; F16D 47/02
[52] U.S. Cl. .................................. 192/106.2; 74/574; 464/59
[58] Field of Search ............ 74/574; 192/106.1, 106.2; 464/59, 64, 66, 68

[56] References Cited

U.S. PATENT DOCUMENTS

| | | | |
|---|---|---|---|
| 2,838,955 | 6/1958 | Burch | 74/574 |
| 3,262,527 | 7/1966 | Allaben, Jr. | 192/58 |
| 3,266,271 | 8/1966 | Stromberg | 64/27 |
| 4,145,936 | 3/1979 | Vincent et al. | 74/574 |
| 4,181,208 | 1/1980 | Davis | 464/59 X |
| 4,557,357 | 12/1985 | Tinholt | 192/106.2 X |
| 4,576,259 | 4/1986 | Bopp | 192/3.21 |
| 4,584,901 | 4/1986 | Conseur | 74/574 |
| 4,615,237 | 10/1986 | Forkel | 74/574 |

FOREIGN PATENT DOCUMENTS 0169024 1/1986 European Pat. Off. .............. 464/59

OTHER PUBLICATIONS

Drawing coded 170286 "Dual Mass Flywheel with Serial Damper" 2/1986.
Foreign paper by A. Sebulke et al., "Das Zwei-Massen-Schwungard, Ein Neuentwickelter Torsiondampfer Fur Der PKW-Antriesstrang", (The Two-Mass-Flywheel, A Newly Developed Torsion Damper for Car Drivelines), Coded 365150. (no date)

Primary Examiner—Dirk Wright
Attorney, Agent, or Firm—P. S. Rulon

[57] ABSTRACT

A torsional damping mechanism (30,32) disposed in a two mass flywheel assembly (24) for reducing the effects of driveline torsionals or vibrations. The assembly includes primary and secondary flywheel masses (26,28), a viscous damper assembly having an annular housing assembly (46c, 50a) integrally formed with the primary flywheel mass, an annular clutch assembly defined by radially inner and outer clutching members (72,74) disposed in the housing, and nested spiral wound springs (58,60) disposed between an inner hub portion (46a) of the primary mass and a radially inner portion (28b) of the secondary mass. The inner clutching member (72) is driven by an axially extending hub portion (28c) of the secondary mass and the outer clutching member (74) is driven by the inner clutching member through a lost motion means defined by splines (72c, 74b). Radially outer ends (58b, 60b) of the spiral wound springs are retained against pivotal movement by fastening means (64, 66) to improve stress distribution in the springs and to reduce friction between the spiral coils of the springs.

17 Claims, 3 Drawing Sheets

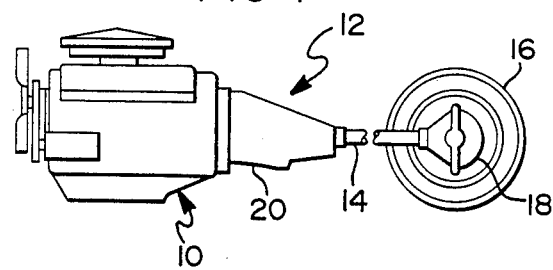
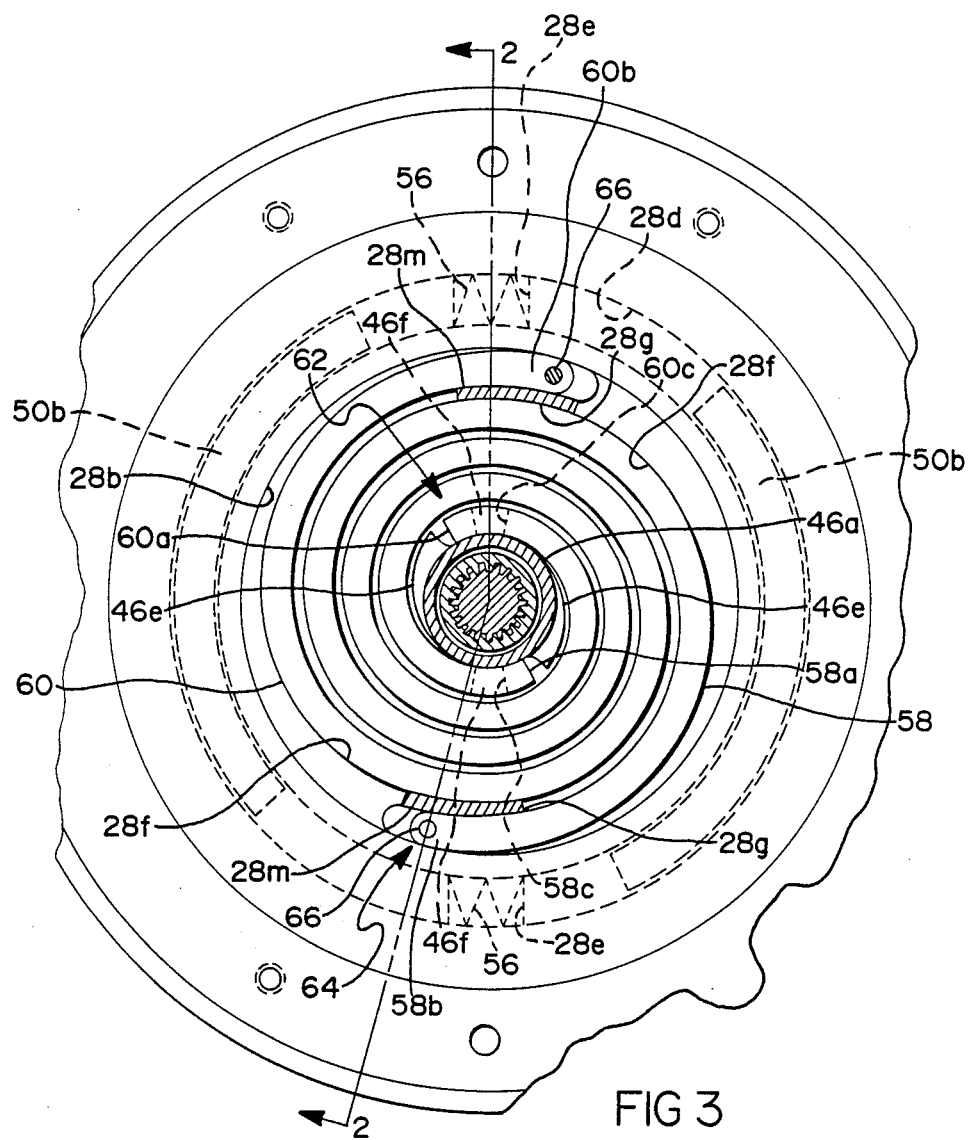

TWO MASS FLYWHEEL ASSEMBLY WITH TORSIONAL DAMPING MEANS

FIELD OF THE INVENTION

This invention relates to a torsional damping mechanism. More specifically the invention relates to such a mechanism for damping torsionals in a vehicle driveline driven by a cyclic combustion engine such as a piston engine

BACKGROUND OF THE INVENTION

Torsion damping mechanisms have long been used to reduce the adverse effects of torsionals or fluctuating torques in vehicle drivelines. Such torsionals or fluctuating torques emanate primarily from engine power pulses and torque spikes, and from abrupt changes in driveline torque due primarily to rapid engine acceleration/deceleration and transmission ratio changes. Effective damping of such torsionals has become increasingly more difficult due to current development trends necessitated by a need to improve vehicle efficiency. The need for improved vehicle efficiency has resulted in reductions in vehicle size and weight, reductions in inertia of driveline components such as flywheel masses, reductions in the number of engine cylinders or chambers, reductions in engine speed, increases in the number of transmission gear radios, reductions in transmission oil viscosity, and increased use of torque converter bypass clutches.

These developments have dramatically rattle, as it is sometimes referred to, can be particularly annoying when a manual transmission is in neutral with the input shaft clutched to an engine running at or near idle speed; under this condition low amplitude engine torsionals rattle meshed gears not under load. Body noise or body boom, as it is sometimes referred to, often occurs when an engine is lugged; under such a condition, engine torsionals cause body components, such as sheet metal panels, to resonate. Vehicle jerk, known as tip-in/tip-out, occurs in response to abrupt engine acceleration/deceleration and ratio changes.

The prior art is replete with torsion damping mechanisms incorporated in conventional clutch plates disposed between engine flywheels and transmissions. It is also known to dispose a torsion damping mechanism between primary and secondary flywheel masses as taught by A. Sebulke et al, "The Two Mass-Flywheel", FISTA-Congress, Belgrade, June 1986. The two mass flywheel assembly of Sebulke and Wangung comprises rotatably mounting the secondary mass on the primary mass, helical compression springs interconnecting the masses, and coulomb or mechanical friction surfaces disposed in parallel with the springs and also interconnecting the masses. This two mass flywheel assembly is said to greatly reduce gear rattle since it can be made to operate in the super critical range at all engine speeds above engine idle. However, the two mass flywheel assemblies have required additional damping mechanism to counter damaging low frequency resonance produced during engine starting and stopping. Additionally, the helical compression springs for attenuating torsionals in this two mass flywheel assembly are disposed radially outward further than they would be in a conventional clutch plate. Accordingly, the helical springs and their associated components are subject to increased friction and wear due to higher centrifugal forces and travel. Additionally, axial space limitations in some installations have prevented application of this two mass flywheel assembly due primarily to the helical springs increasing the overall axial length of the assembly.

SUMMARY OF THE INVENTION

An object of this invention is to provide a torsion damping mechanism having improved attachment of torsional attenuating springs.

Another object of this invention is to provide a two mass flywheel assembly having improved positioning of the torsional attenuating springs.

Another object of this invention is to provide a two mass flywheel assembly operative to effectively dampen all modes of resonance.

Another object of this invention is to provide a two mass flywheel assembly having axially reduced length.

According to a feature of this invention, a torsional damping mechanism includes first and second members mounted for limited relative rotation about a common axis; a damping assembly including first and second clutch means respectively fixed to the first and second members and disposed for clutching coaction therebetween in response to relative rotation of the members; first and second nested spiral wound springs each having a radially inner and outer end; the first member having a portion for securing the radially inner ends of the springs thereto; and the second member having a portion spaced radially outward of the first member portion and including fastening means for securing the radially outer ends of the springs thereto, the fastening means including means restricting circumferential movement of the outer spring ends relative to the second member and surface means defined by the second member portion, the surface means being in supporting contact with a radially inward facing portion of the springs adjacent the radially outer ends for restricting pivotal movement of the outer spring ends during spring windup. The features of restricting pivotal movement of the spiral spring outer ends improves stress distribution in the spiral coils of the springs and reduces friction between the spiral costs of the springs.

According to another feature of this invention, a torsional damping mechanism includes a damping assembly and resilient means connected in parallel with each other and drivingly interposed between first and second flywheel masses mounted for limited relative rotation about a common axis, the first mass being adapted for direct connection to an engine output shaft and having a hub portion at its radially inner extent; the second mass adapted for selective connection to a transmission input shaft via a clutch operative to frictionally engage a surface of the second mass and having an inner portion disposed radially inward of the surface and in radial alignment with the hub portion of the first mass; the damping assembly including first and second clutch means respectively fixed to the first and second masses and disposed for clutching coaction therebetween in response to relative rotation of the members; and the resilent means being first and second nested spiral wound springs each having a radially inner and outer end; and fastening means for respectively securing the inner and outer ends to the hub portion of the first mass and to the inner portion of the second mass.

According to another feature of the invention, a torsional damping mechanism includes resilient means and a torsional damping assembly connected in parallel with each other and drivingly interposed between first and second flywheel masses mounted for limited relative rotation about a common axis, the first mass being adapted for direct connection to an engine output shaft, the second mass adapted for selective connection to a transmission input shaft via a clutch plate operative to frictionally engage a surface of the second mass; the resilient means including springs interconnecting the masses for transmitting torque therebetween and operative to flex and thereby attenuate torsionals; a viscous shear damper including an annular housing assembly fixed to one of the masses and a clutch assembly fixed to the other mass, the housing assembly including first and second radially extending surfaces in axially facing and spaced relation defining a chamber sealed at its radially outer extent, and the clutch assembly having a radially extending member disposed in the chamber and having oppositely facing clutching surfaces spaced from the first and second surfaces for clutching coaction therebetween via a viscous shear liquid in the chamber and in response to flexing of the resilient means, and dynamic seal means cooperating between the housing and clutch assemblies for sealing the radially inner portion of the chamber.

The torsional damping mechanism according to the preceding feature further including the feature of the first surface of the housing assembly being defined by an annular recess in the one mass and the second surface being defined by an annular radially extending cover member having a radially outer portion sealingly fixed to the one mass. This arrangement reduces the overall axial length of two mass flywheel with torsional damping.

The torsional damping mechanism according to the previous feature further including the feature of the one mass being the first mass. This arrangement separates the damper housing and the viscous shear liquid therein form heat generated during frictional engagement of the clutch plate with the surface of the second mass.

BRIEF DESCRIPTION OF THE DRAWINGS

The two mass flywheel with the torsional damping mechanism of the present invention is shown in the accompanying drawings in which:

FIG. 1 is a schematic view of a motor vehicle driveline;

FIG. 3 is reduced size, partially broken away, sectional view of the torsional damping mechanism looking along line 3—3 of FIG. 2;

DETAILED DESCRIPTION OF THE DRAWINGS

Figure 2:
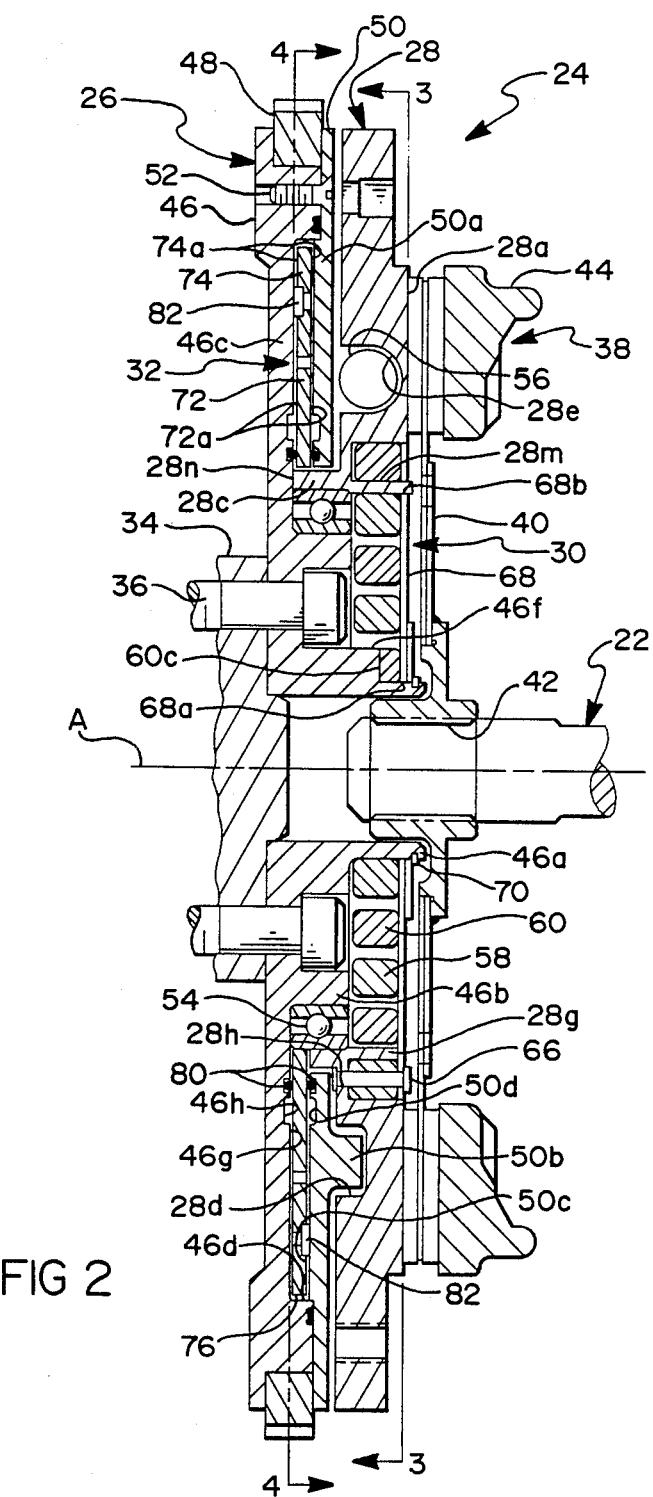
FIG. 2 is a full sectional view of the torsional damping mechanism looking along line 2—2 of FIG. 3.

The motor vehicle driveline seen schematically in FIG. 1 includes a prime mover 10 and a transmission 12 having an output shaft 14 drivingly connected to a load such as a ground engaging wheel 16 via a differential gear assembly 18 for a rear and/or front axle of a vehicle. Prime mover 10 is preferably of the internal, periodic combustion type but may be any type of power plant having torque characteristics that are improved by a torsional damping mechanism. Transmission 12 includes a housing 20 containing a plurality of unshown, constant mesh ratio gears or ratio change mechanisms driven by a transmission input shaft 22 partially shown in FIG. 2. Well-known ratio change clutches or devices within the transmission are employed to selectively, i.e., manually or automatically, connect input shaft 22 with load driving shaft 14.

Figure 4:
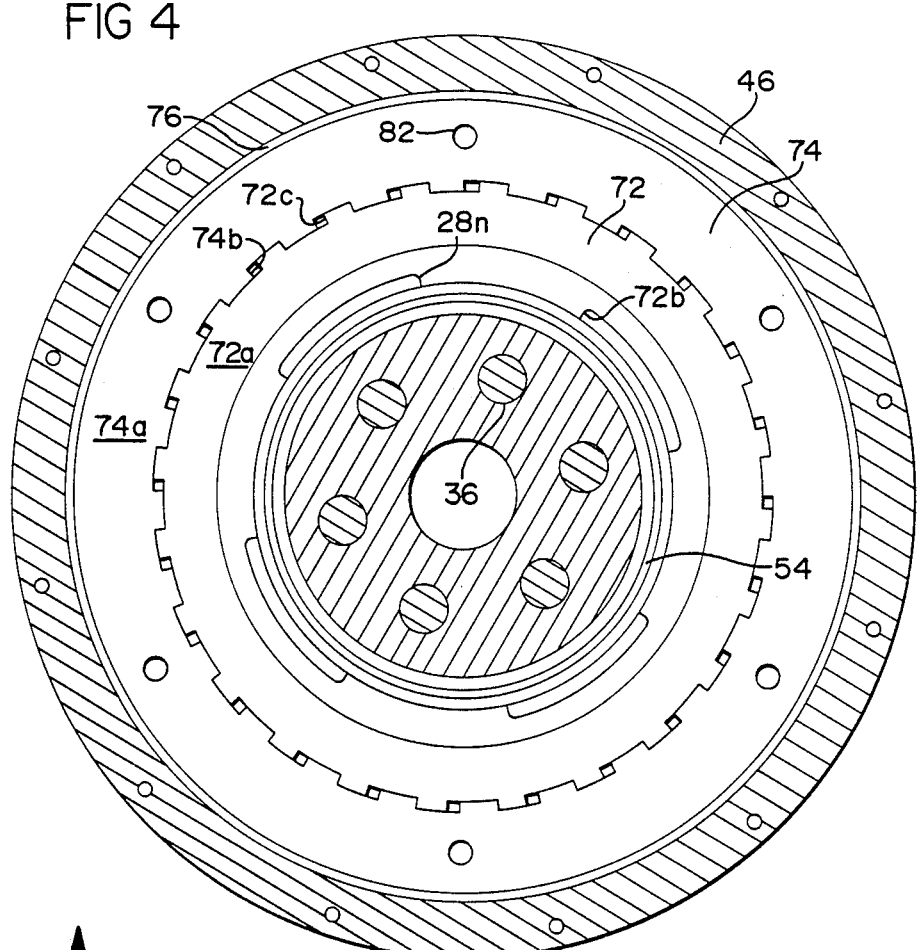
FIG. 4 is a reduced size sectional view of the torsional damping mechanism looking along line 4—4 of FIG. 2.

Looking now specifically at FIGS. 2–4, therein is illustrated a two mass flywheel assembly 24 with a torsional damping mechanism. The assembly comprises primary and secondary or first and second flywheel masses 26, 28 rotatable about a common axis A, resilient means 30 for attenuating driveline torsionals; and friction means 32 for damping the torsionals. Herein, friction means 32 is a viscous shear clutch or coupling assembly. Primary mass 26 is operative to rotate about an axis A common to the rotational axes of shaft 22 and secondary mass 28. The primary mass is fixed directly to a partially shown portion 34 of the engine output shaft by a plurality of bolts 36. Secondary mass 28 includes an annular friction surface portion 28a frictionally connectable to input shaft 22 of the transmission in response to selective engagement of a partially shown master clutch assembly 38. The clutch assembly includes a clutch plate 40 fixed for rotation with shaft 22 via a spline connection 42 and an annular pressure plate 44 fixed to rotation to secondary mass 28 via an unshown and conventional mechanism operative to squeeze friction linings of the clutch plate against surface 28a of the secondary mass 28.

Primary mass 26 includes an annular member 46, a starter ring gear 48, and an annular flange or cover member 50. The gear and cover are both fixed to a radially outer portion of member 46 by conventional means. Herein, the cover is secured by a plurality of circumferentially spaced screws 52. Radially inner portions of member 46 include inner and outer, axially extending hub portions 46a, 46b which are axially and radially spaced apart. Inner hub portion 46a provides means for securing resilient means 30 to member 46. Outer hub 46b portion defines a peripheral surface for journaling secondary mass 28 on member 46, i.e., primary mass 26. An intermediate, annular, radially extending sidewall portion 46c of member 46 is formed with an annular, radially extending recess 46d. Cover 50 includes an annular, radially extending sidewall portion 50a and two arcuate ribs 50b extending therefrom. This arrangement of recess 46d and sidewall portions 46c, 50a defines an annular housing assembly for the viscous damper to be described further hereinafter. Further, this arrangement facilitates use of a viscous damper without increasing the overall axial dimensions of flywheel masses 26, 28.

Secondary mass or member 28 includes an inner portion 28b (FIG. 3) radially aligned with and radially spaced from inner hub portion 46a of member 46, and an axially extending hub portion 28c having an inner peripheral surface journaled on outer hub portion 46b of member 46 via a conventional bearing 54. Herein, bearing 54 is of the ball type and is shown with the balls visible only in FIG. 2. Inner portion 28b defines means for securing resilient means 30 to the secondary mass or member 28. Secondary mass 28 also includes an annular, axially open groove 28d and two pockets 28e disposed diametrically opposite each other. Pockets 28e retain resilient bumper means such as schematically shown springs 56 in FIG. 3. Bumper springs 56 react against circumferentially facing ends of arcuate ribs 50b of cover 50 to resiliently limit relative rotation of the flywheel masses to approximately forty and twenty rotational degrees in the forward and reverse torque direction, respectively.

Looking now more specifically at resilient means 30 and damper assembly 32, resilient means 30 includes first and second, long travel, nested, spiral wound springs 58, 60 having radially inner ends 58a, 60a and radially outer ends 58b, 60b. The inner ends are secured for rotation with inner hub portion 46a of member 46 via fastening means 62 and the outer ends are secured for rotation with inner portion 28b of member 28 via fastening means 64. The overall axial dimensions of flywheel assembly 24 with torsion damping is greatly reduced relative to other such assemblies by the use of spiral wound, nested springs and, particularly, by positioning the springs radially inward of friction surface 28a of the secondary mass.

Fastening means 62 include two radially outwardly facing scroll surfaces 46e, two radially outwardly extending lugs 46f, and radially extending recesses 58c, 60c formed in the spring inner ends and loosely receiving lugs 46f. The scroll surfaces provide seats or supports which mate with the scroll shaped surfaces of the spiral wound springs to reduce transverse stress in the springs as they windup or decrease in overall diameter during positive or forward torque transmission from engine 10 to transmission 12. The circumferentially spaced sides of lugs 46f, and recesses 58c, 60c are preferably divergent to prevent radial disengagement therebetween during reverse or coast mode torque operation which unwinds or increases the overall diameter of the springs.

Fastening means 64 prevent radial and axial movement of spring ends 58c, 60c relative to member 28. The fastening means include identical component parts for each spring end; hence, shown or referenced component parts at either outer spring end will suffice for both spring ends. Accordingly, fastening means 64 includes two symmetrical and radially inwardly facing scroll surfaces 28f (FIG. 3), and (at each spring end) a flange portion 28g, a bore 28h, and a pin 66. Each flange portion 28g extends axially from member 28 in cantilever fashion, and defines a radially and axially extending surface 28m facing radially outward and in supporting contact with a radially inwardly facing surface portion of the spring adjacent the associated spring end. Surface 28m restrains the radially outer spring ends against pivotal movement to improve stress distribution in the springs and to reduce friction between the spiral coils of the springs. Each pin 66 includes a shank portion slidably received in a bore in each spring end and a shank or end portion securely fixed in bore 28h by known means, e.g., threads, press fit, etc. Closely associated with fastening means 62, 64 is a disk or plate like member 68 having a central opening 68a received by the free end of inner hub portion 46a of member 46 and two arcuate slots 68b receiving the free ends of flange portions 28g. The radially inner edge or outward facing surfaces of the slots provide support for flange portions 28g. Plate member 68 is secured against axial movement relative members 46, 28 a by snap ring 70 and the heads of pins 66, respectively.

Looking now at damping assembly 32, the assembly includes the annular housing assembly defined by the sidewall portions 46c, 50a and an annular clutch assembly defined by radially inner and outer annular clutching members 72, 74. The sidewalls 46c, 50a of annular housing have annular radially extending clutching surfaces 46g, 50c defining a radially extending chamber 76. The chamber is closed at its radially outer extent by mating portions of members 46, 50, and is sealed by screws 52 and a static seal 78. Clutching members 72, 74 include oppositely facing, radially extending clutching surfaces 72a, 74a disposed within the chamber in close axially spaced relation with sidewall clutching surfaces 46g, 50c for viscous clutching coaction therewith via a viscous liquid in the chamber. The viscous liquid is of high viscosity and is preferably a silicone oil, for example, dimethyl polysiloxane. The inner periphery of inner clutching member 72 includes a plurality of internal spline teeth 72b snugly mating with teeth 28n formed in the free axially facing end of hub portion 28c of member 28. The outer periphery of clutching member 72 includes a plurality of external spline teeth 72c mating with internal spline teeth 74b formed on the inner periphery of clutch member 74. The radial flanks of teeth 72c, 74b may be provided with a predetermined circumferential spacing therebetween to form a lost motion means allowing minor to-and-fro relative rotation between the two clutching members. Chamber 76 is closed at its radially inner extent by annular, dynamic seals 80 disposed in annular grooves in sidewalls 46e, 50a. The seals also axially center inner clutching member 72 in chamber 76 to prevent rubbing of the closely spaced clutching surfaces. Outer clutching member 74 is centered in the chamber for the same reasons by a plurality of low friction buttons 82 shown in relief and retained in recesses in member 74. Annular grooves 46h, 50d in sidewall members 46c, 50a and disposed radially outward of seals 80 provide chamber 76 with reservoir for reserve oil capacity and oil expansion.

Figure 5:
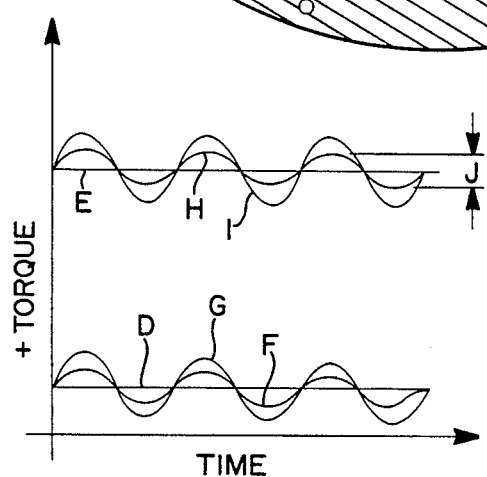
FIG. 5 is a graph schematically illustrating a band of low amplitude torsionals not damped by a damping device in the torsional damping mechanism.

Operation of viscous damper assembly 32 may be more readily understood by reference to the graph in FIG. 5. The graph schematically illustrates two positive or forward driveline torque levels with so called steady-state or average torques represented by straight curves D and E and with sinusoidal curves F, G and H, I respectively superimposed thereon to represent torsionals of different amplitudes. The low amplitude torsionals F and H correspond to torque changes having peak-to-peak changes J which require little or no viscous damping, i.e., torsionals which are readily absorbed by the driveline and/or the system/load drive by the driveline. Such low amplitude torsionals flex torsion attenuating springs 58, 60 and cause relative rotation between viscous clutching surfaces 46g, 50c of the housing assembly and viscous clutching surfaces 72a of clutching member 72 without corresponding relative rotation of clutching member surfaces 74a relative to surfaces 46g, 50c due to the lost motion between the splines of members 72c, 74b. The higher amplitude torsionals G and I effect relative rotations greater than the lost motion and therefore, cause clutching member surfaces 74a to also rotate relative to housing clutching surfaces 46g, 50c. Hence, independent of the magnitude of steady-state torque, damping assembly 32 may be made to provide little or no damping for low amplitude torsions and increasing amounts of damping for higher amplitude torsionals by providing one or more clutching members 74 which become successively active in response to higher amplitude torsionals.

Flywheel assembly 24 may also be provided with a lost motion means or low spring rate means interposed in series between spring means 30 and at least one of the flywheel masses to further reduce idle rattle tendencies in some driveline applications. Examples of such low rate spring means may be found in U.S. Pat. No. 4,608,883 and in U.S. patent application Ser. No. 793,802, filed Nov. 11, 1985.

A preferred embodiment of the present invention has been disclosed herein for illustration purposes. The disclosed embodiment includes a torsional damping mechanism having spring fastening means which improves stress distribution in spiral wound springs and which reduces friction between the spiral coils of the springs. The disclosed embodiment also includes a two mass flywheel assembly having a viscous damper which increases damping in response to increasing relative rotational velocity of the damper's clutching surfaces. Since the damper is velocity responsive, it is effective to dampen both high and low frequency torsionals and is also effective to dampen both high and low frequency resonance. The viscous damper is structurally incorporated in or formed with one of the flywheel assembly masses without increasing the overall axial length of the assembly. More specifically, the viscous damper is incorporated into the primary mass of the flywheel assembly to prevent direct heat flow to the damper from a master clutch friction surface defined by the secondary mass. Further, the overall axial length of the two mass flywheel assembly is greatly reduced relative to other such assemblies by use of spiral wound, nested springs positioned radially inward of the secondary mass and particularly radially inward of the master clutch friction surface defined by the secondary mass. Still further, since the springs are positioned closer to the axis of rotation than coil compression springs in prior art two mass flywheel assemblies, they are less affected by centrifugal forces and, therefore, exhibit less wear and parasitic friction.

What is claimed is:

1. A torsional damping mechanism comprising first and second flywheels respectively adapted for direct connection to an engine and selective connection to a multiratio transmission; a damping assembly including first and second clutch elements respectively fixed to said first and second flywheels and disposed for clutching coaction therebetween in response to relative rotation of the numbers; said first flywheel including axially extending outer and inner hub portions radially and axially spaced apart, said outer hub portion having an outer peripheral surface; said second flywheel including an annular, axially extending hub portion drivingly connected to said second element of the damping assembly and having an inner peripheral surface journaled on the outer peripheral surface of the outer hub member of the first flywheel; first and second nested spiral wound springs each having a radially inner and outer end; said first flywheel having a portion for securing the radially inner ends of the springs thereto; said second flywheel having a portion spaced radially outward of the first flywheel portion and including fastening means for securing the radially outer ends of the springs thereto; said fastening means including means for restricting circumferential movement of the outer spring ends relative to the second flywheel and surface means rigid with the second flywheel portion, said surface means being in supporting contact with a radially inwardly facing surface portion of the springs adjacent their radially outer ends for restricting pivotal movement of the spring ends during spring windup for improving stress distribution in the spring.

2. The mechanism of claim 1, wherein said damping assembly comprises a viscous shear damper with said first element including an annular, radially extending chamber having axially facing and spaced apart clutch surfaces and with said second element including a clutch member disposed in said chamber and having first and second radially extending, oppositely facing clutch surfaces respectively spaced from the first and second axially facing clutch surfaces of the chamber for clutching coaction therebetween via a viscous shear liquid disposed in the chamber and in response to relative rotation of the flywheels.

3. A torsional damping mechanism including a damping assembly and resilient means connected in parallel with each other and drivingly interposed between first and second flywheel masses mounted for limited relative rotation about a common axis, the first mass being adapted for direct connection to an engine output shaft and having an inner hub portion at its radially inner extent; the second mass adapted for selective connection to a transmission input shaft via a clutch operative to frictionally engage a surface of the second mass, the second mass having an inner portion disposed radially inward of said surface and in radial alignment with the inner hub portion of the first mass; the damping assembly including first and second clutch means respectively fixed to the first and second masses and disposed for torsion damping clutching coaction therebetween in response to relative rotation of the masses; the resilient means being first and second nested, spiral wound springs each having a radially inner and outer end, and fastening means for respectively securing the inner and outer ends of the springs to the hub portion of the first mass and to the inner portion of the second mass.

4. The mechanism of claim 3, wherein said first flywheel mass includes an outer hub portion having an outer peripheral surface radially and axially spaced from the first hub portion, said second flywheel mass includes an annular axially extending hub portion having an inner peripheral surface journaled on the outer peripheral surfaces of the outer hub member of the first flywheel mass, said clutch first and second clutch means of said damping assembly defining a viscous shear damper, said first clutch means including an annular, radially extending chamber having axially facing and spaced apart clutch surfaces, said second clutch means including an annular clutch member having a radially inner portion driven by the hub portion of the second flywheel mass and an outer portion disposed in said chamber and having first and second radially extending, oppositely facing clutch surfaces respectively spaced from the first and second axially facing clutch surfaces of the chamber from clutching coaction therebetween via a viscous shear liquid disposed in the chamber and in response to flexing of nested spiral wound springs.

5. The mechanism of claim 4, wherein said fastening means includes means restricting pivotal movement of the outer spring ends during spring windup.

6. The mechanism of claim 5, wherein said restricting means comprise axially and radially extending surfaces defined by flanges projecting from a portion of the second member in cantilever fashion, said surfaces being in supporting contact with radially inwardly facing surface portions of the springs adjacent their outer ends.

7. A torsional damping mechanism including resilient means and a damping assembly connected in parallel with each other and drivingly interposed between first and second flywheel masses mounted for limited relative rotation about a common axis, said flywheel masses being adapted to be disposed between first and second drives of a driveline with the first mass adapted for direct connection to the first drive and the second mass adapted for connection to the second drive; said resilient means interconnecting the masses for transmitting driveline torque therebetween and operative to flex and thereby attenuate driveline torsionals; said damper assembly being a viscous shear damper including an annular housing assembly fixed to one of the masses and a clutch assembly driven by the other mass, said housing assembly including first and second sidewalls respectively defining first and second radially extending clutch surfaces in axially facing and spaced relation defining a chamber sealed at its radially outer extent, and said clutch assembly having a radially extending clutching means disposed in the chamber and having first and second radially extending, oppositely facing clutch surfaces respectively spaced from the first and second axially facing surfaces of the sidewalls for clutching coaction therebetween via a viscous shear liquid disposed in the chamber and in response to flexing of the resilient means, and dynamic seal means cooperating between said housing and clutch assemblies for sealing the radially inner portion of said chamber.

8. The flywheel assembly of claim 7, wherein said one mass includes an annular, radially extending mass adapted to be directly fixed to the one drive and having an intermediate portion between radially and inner portions thereof defining said first sidewall and the first surface of said housing assembly; said second sidewall and second surface being defined by an annular radially extending flange member sealingly fixed at a radially outer portion to a radially outer portion of said one member.

9. The flywheel assembly of claim 8, wherein said first flywheel mass includes an annular axially extending outer hub portion having an outer peripheral surface, said second flywheel mass including an annular axially extending hub portion drivingly connected to a radially inner portion of the clutch means and having an inner peripheral surface journaled on the outer peripheral surface of the outer hub portion of said first flywheel mass.

10. The flywheel assembly of claim 9, wherein said clutch means includes inner and outer radially aligned and radially extending clutch members each defining a portion of said first and second clutch surfaces, said inner clutch member defining said radially inner portion drivingly connected to the hub portion of said second flywheel mass, and radially inner and outer portions of said outer and inner clutch members respectively being drivingly interconnected by lost motion means for allowing minor rotation of the inner clutch member relative to the surfaces of the housing sidewalls without a corresponding relative rotation of the outer clutch member.

11. The flywheel assembly of claim 7, wherein said clutch assembly driven by the other mass includes drive means allowing axial movement of the clutch means in said chamber, and said dynamic seal means comprises first and second seals disposed on opposite sides of the clutch means and operative to space the surfaces of the clutch means from the surfaces of the housing assembly.

12. The flywheel asembly of claim 7, wherein said clutch means include inner and outer clutch members each defining a portion of said first and second clutch surfaces, said inner clutch member defining said radially inner portion drivingly connected to the portion of said second flywheel mass and including means allowing axial movement therebetween, said dynamic seal means comprises first and second seals disposed on opposite sides of the inner clutch member and operative to space the surfaces of the inner clutch member from the surfaces of the housing assembly, radially inner and outer portions of said outer and inner clutch members including means interconnecting the clutch members for rotation and allowing axial movement therebetween, and means disposed on opposite sides of the outer clutch member for spacing its oppositely facing surfaces from the surfaces of the housing assembly.

13. The flywheel assembly of claim 12, wherein said means interconnecting the clutch members includes lost motion means for allowing minor rotation of the inner clutch member relative to the surfaces of the housing sidewalls without a corresponding relative rotation of the outer clutch member.

14. A flywheel assembly including first and second flywheel masses mounted for relative rotation about a common axis and adapted to be disposed between first and second drives of a driveline, the first mass adapted for direct connection to the first drive and the second mass adapted for selective connection to the second drive via a master clutch operative to frictionally engage a surface of the second flywheel mass;
resilient means interconnecting the masses for transmitting driveline torque between the masses and operative to flex and thereby attenuate driveline torsionals;
damping means drivingly interposed between the masses; the damping means characterized by:
the first flywheel mass including first and second radially extending, axially facing surfaces defining a chamber sealed at its radially outer extend; and
an annular clutch assembly disposed in the chamber and having first and second radially extending surfaces respectively spaced from the axially facing surfaces of the chamber for clutching coaction therewith via a viscous shear liquid disposed in the chamber, the clutch assembly driven at its inner extent by the second flywheel mass.

15. The flywheel assembly of claim 14, wherein said first flywheel mass includes a hub portion having a peripheral surface and said second flywheel mass includes a hub portion having a periphereal surface journaled on the peripheral surface of first flywheel hub portion.

16. The flywheel assembly of claim 15, wherein the hub portion of the second flywheel mass includes means for providing the driving connection between the clutch assembly of the damping means and the second flywheel mass.

17. The flywheel assembly of claim 14, wherein said clutch assembly of the damping means includes lost motion means for allowing minor relative rotation of the flywheel masses without corresponding relative rotation between the chamber surfaces of the damping means and at least a portion of the surfaces of the annular clutch assembly.

* * * * *